(12) United States Patent
Lee

(10) Patent No.: US 8,596,713 B1
(45) Date of Patent: Dec. 3, 2013

(54) APPARATUS FOR ASSEMBLING FENDER PANEL OF VEHICLE

(71) Applicant: Sang Ill Lee, Seoul (KR)

(72) Inventor: Sang Ill Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/622,110

(22) Filed: Sep. 18, 2012

(30) Foreign Application Priority Data

Jun. 18, 2012 (KR) .................. 10-2012-0064703

(51) Int. Cl.
*B62D 25/16* (2006.01)
(52) U.S. Cl.
USPC .............. 296/198; 296/193.09; 296/193.04; 296/203.02
(58) Field of Classification Search
USPC ............. 296/198, 193.04, 193.09, 203.02
See application file for complete search history.

(56) References Cited

U.S. PATENT DOCUMENTS

| | | | | |
|---|---|---|---|---|
| 5,429,412 A | * | 7/1995 | Schoen et al. | 296/29 |
| 6,334,645 B1 | * | 1/2002 | Ban | 296/198 |
| 6,805,400 B2 | * | 10/2004 | Bruderick et al. | 296/193.09 |
| 7,469,929 B2 | | 12/2008 | Viens | |
| 7,909,392 B2 | * | 3/2011 | Takeuchi et al. | 296/198 |
| 8,087,721 B2 | * | 1/2012 | Kralevich et al. | 296/198 |
| 2007/0216199 A1 | * | 9/2007 | Ito et al. | 296/198 |

FOREIGN PATENT DOCUMENTS

| | | |
|---|---|---|
| JP | 2007-296884 (A) | 11/2007 |
| KR | 10-0461057 B1 | 12/2004 |
| KR | 10-0568673 B1 | 4/2006 |
| KR | 10-2008-0047691 A | 5/2008 |

* cited by examiner

*Primary Examiner* — Dennis Pedder
(74) *Attorney, Agent, or Firm* — Morgan, Lewis & Bockius LLP

(57) ABSTRACT

An apparatus for assembling a fender panel of a vehicle, including a single-type bracket may have a horizontal assembly surface at an upper end portion thereof, and an assembly end having a fender panel assembly aperture at a lower end portion thereof extending from the horizontal assembly surface toward a front side of the vehicle, wherein the assembly end of the single-type bracket may be mounted on a front end portion of a fender panel located between a front end module and a bumper cover, and wherein the horizontal assembly surface may be fixed to a lower end portion of a fender apron upper member.

6 Claims, 6 Drawing Sheets

APPARATUS FOR ASSEMBLING FENDER PANEL OF VEHICLE

CROSS-REFERENCE TO RELATED APPLICATION

The present application claims priority to Korean Patent Application No. 10-2012-0064703 filed Jun. 18, 2012, the entire contents of which is incorporated herein for all purposes by this reference.

BACKGROUND OF THE INVENTION

1. Field of the Invention

The present invention relates to an apparatus for assembling a fender panel of a vehicle. More particularly, the present invention relates to an apparatus for assembling a fender panel of a vehicle, which can easily control the fender panel of the vehicle in back-and-forth or right-and-left horizontal directions and also save cost by a simple assembly structure.

2. Description of Related Art

Generally, a fender apron is provided on the right and left sides of an engine room of a vehicle to serve as a partition with respect to a wheel and support a force delivered from a suspension. Also, a front fender (hereinafter, referred to as a fender panel) surrounding a tire is disposed outside the fender apron.

Usually, since the fender panel defines a boundary with a lamp and a bumper in addition to a hood panel, fitting gap step adjustment with the hood panel and the bumper is needed during the assembly of the fender panel.

Hereinafter, a typical fender panel assembly structure will be described with reference to FIGS. 1 through 3.

Referring to FIGS. 1 and 2, a hood panel 20 and a bumper cover 30 are provided. Also, a fender panel 10 is assembled using two brackets such that parting lines with the hood panel 20, a head lamp 25 and the bumper cover 30 can be adjusted in back-and-forth and right-and-left horizontal directions.

A first bracket 11 of the two brackets is integrally welded to a front side member 50, and has a bolting aperture 14 for coupling with a second bracket 12 at a side portion thereof.

The second bracket 12 is integrally connect to the lower end of the fender panel 10 by welding or bolting at an outer end portion thereof, and the second bracket 12 has an expansion aperture 15 with a larger diameter than the bolting aperture 14 of the first bracket 11 at the inner end portion thereof.

Accordingly, the inner end portion of the second bracket 12 is allowed to overlap the first bracket 11, and simultaneously, the expansion aperture 15 of the second bracket 12 is allowed to align with the bolting aperture 14 of the first bracket 11. Then, a bolt 16 is inserted into the expansion aperture 15 and the bolting aperture to fix the assembly of the first bracket 11 and the second bracket 12.

In this case, when the bolt 16 is not completely fastened in a temporary assembly, the second bracket 12 integrally coupled to the fender panel 10 is moved in back-and-forth and right-and-left horizontal directions to adjust a gap between the expansion aperture 15 of the second bracket 12 and the bolt 16. Thus, the gap step difference of the fender panel 10 can be adjusted with respect to the parting lines with the hood panel 20 and the bumper cover 30.

The front end portion of the second bracket 12 is integrally connected to a front end module 40 coupled to the bumper cover 30 to provide a supporting stiffness for the front end portion of the fender panel 10.

For reference, the front end module 40 refers to a component that is modularized for easiness of assembly of a carrier that forms the frame, a head lamp, a radiator, and a front bumper beam.

However, the typical fender panel assembly structure has the following limitations.

First, since the two brackets, i.e., the first and second brackets are used to control the assembly location of the fender panel in back-and-forth and right-and-left horizontal directions, the weight of the vehicle body and the manufacturing cost may increase.

Second, since the gap step difference of the fender panel is adjusted while the first and second brackets are being separately assembled, the assembly working time may increase, and thus the assembly workability may be reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for assembling a fender panel of a vehicle, which can reduce the weight of the vehicle body, the manufacturing cost, and the assembly working time by assembling the fender panel while controlling the assembly location the fender panel in back-and-forth and right-and-left directions using a single-type bracket.

In an aspect of the present invention, an apparatus for assembling a fender panel of a vehicle, may include a single-type bracket having a horizontal assembly surface at an upper end portion thereof, and an assembly end having a fender panel assembly aperture at a lower end portion thereof extending from the horizontal assembly surface toward a front side of the vehicle, wherein the assembly end of the single-type bracket is mounted on a front end portion of a fender panel located between a front end module and a bumper cover, and wherein the horizontal assembly surface is fixed to a lower end portion of a fender apron upper member.

The horizontal assembly surface of the single-type bracket is fixed to the lower end portion of the fender apron upper member by welding while controlling an assembly location of the fender panel in back-and-forth and right-and-left horizontal directions.

The front end module adjacent to the assembly end of the single-type bracket may include stiffness enhancing ends protruding and extending in a longitudinal direction at upper and middle portions of the front end module.

The single-type bracket may have a plurality of stiffness enhancing grooves that cross each other in a longitudinal direction thereof between the horizontal assembly surface and the assembly end.

The single-type bracket may have a three-dimensional hanger grip shape that extends from the horizontal assembly surface at the upper portion thereof to the assembly end at the lower portion thereof.

The horizontal assembly surface and assembly end are integrally bent to form a shape of "¬".

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
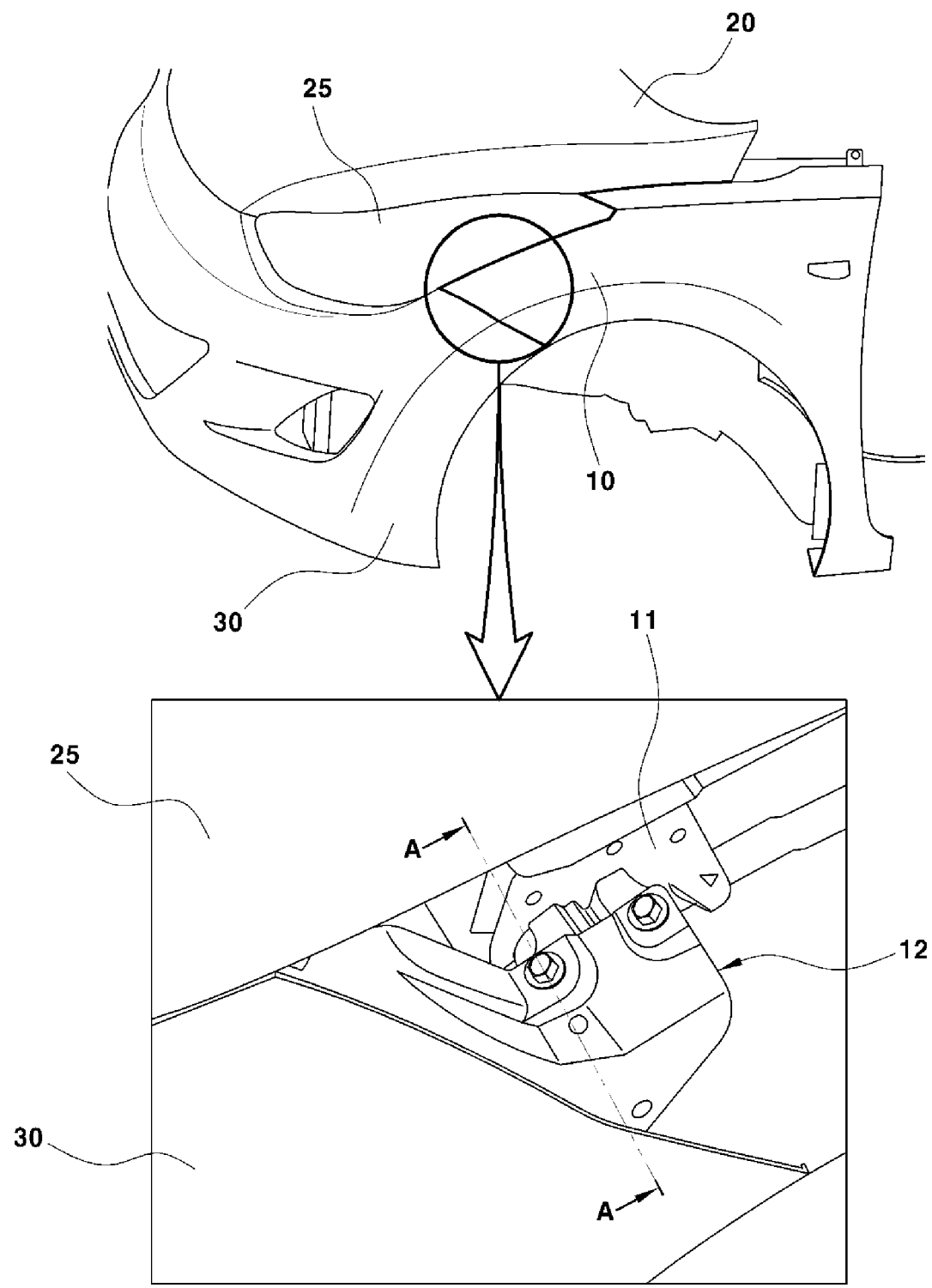
FIG. 1 is a perspective view illustrating a typical fender panel assembly structure of a vehicle.
Figure 2:
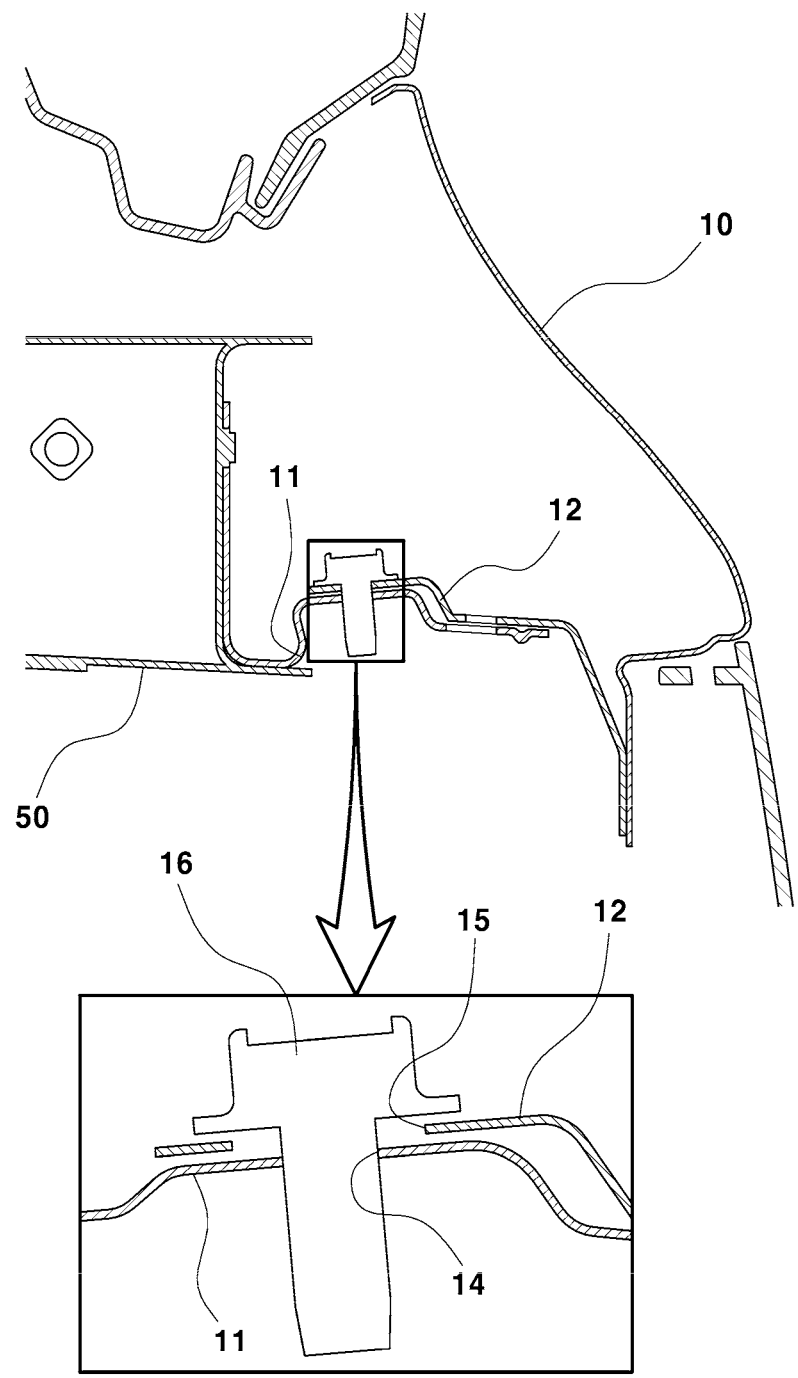
FIG. 2 is a cross-sectional view taken along line A-A of FIG. 1.
Figure 3:
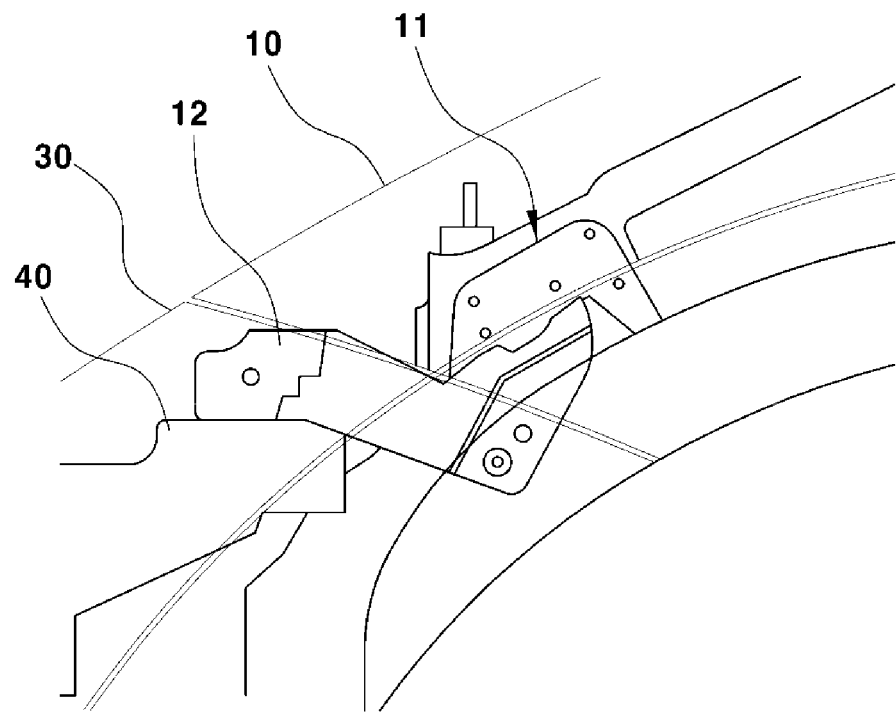
FIG. 3 is a side view illustrating a typical fender panel assembly structure of a vehicle.
Figure 4:
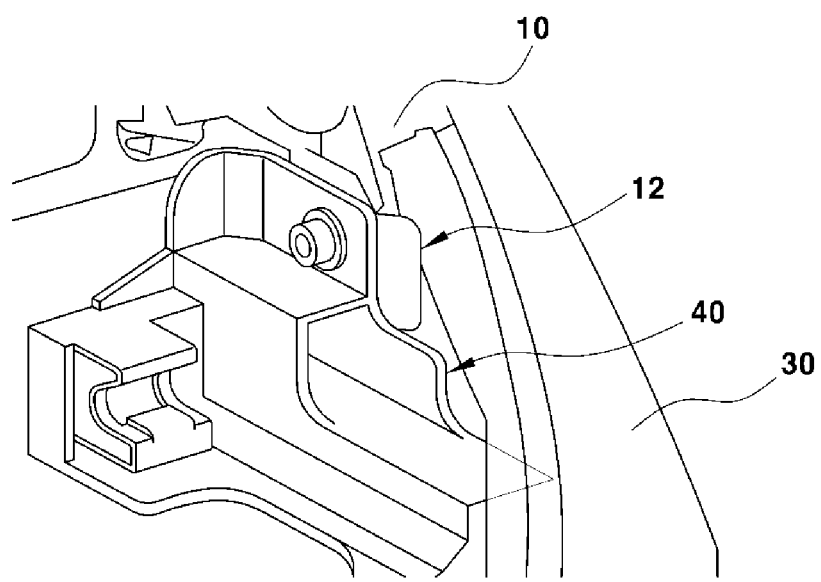
FIG. 4 is a view of a typical fender panel assembly structure, which illustrates an assembly relation between a second bracket and a front end module.

Reference numerals set forth in the Drawings includes reference to the following elements as further discussed below, It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplar embodiments of the present invention will be described in detail with reference to the accompanying drawings.

The present invention provides a simple fender panel assembly structure, which can install a fender panel while controlling the assembly location thereof using a new type of single-type bracket instead of two typical brackets.

For this, a hanger grip type of single-type bracket 100 that can be mounted while controlling the assembly location may be provided.

Figure 5:
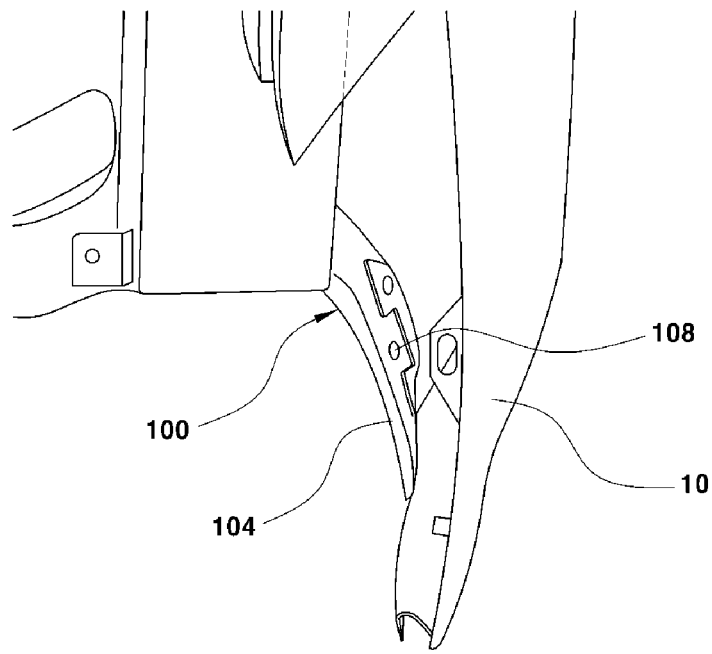
FIGS. 5 and 6 are perspective views illustrating a fender panel assembly structure of a vehicle according to an exemplary embodiment of the present invention.
Figure 6:
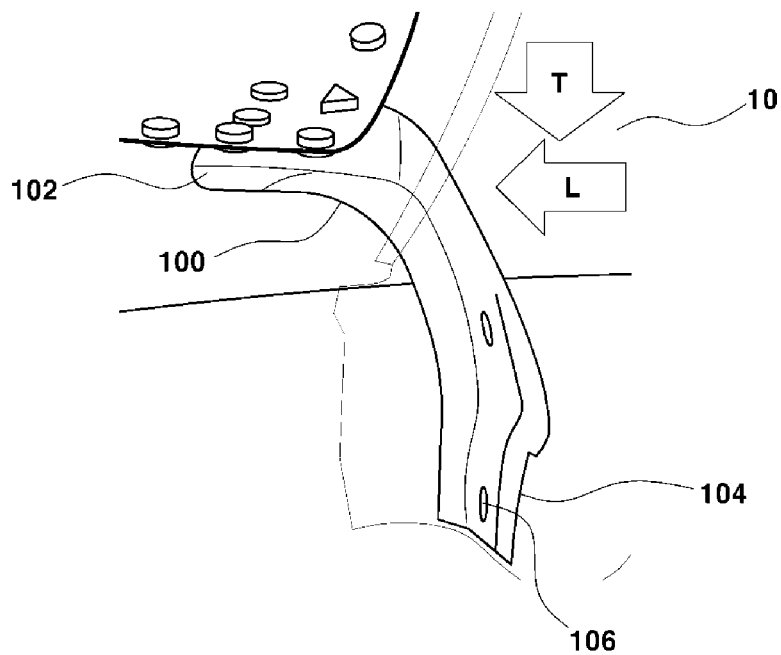
Figure 7:
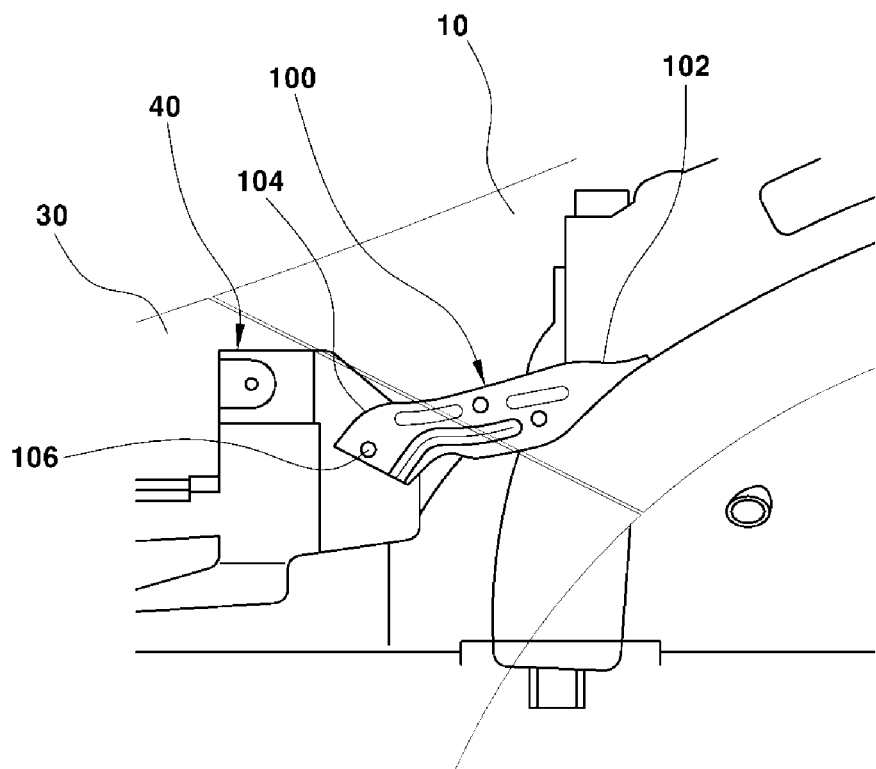
FIG. 7 is a side view illustrating a fender panel assembly structure of a vehicle according to an exemplary embodiment of the present invention.

As shown in FIGS. 5 through 7, the single-type bracket 100 may be a hanger type that extends from the upper end to the lower end. The extending portion of the single-type bracket 100 may not be straight but may be bent toward the front. A horizontal assembly surface 102 may be formed at the upper end portion of the single-type bracket 100 that is flat. The lower end portion of the horizontal assembly surface 102 may be provided with an assembly end 104 having a fender panel assembly aperture 106.

The horizontal assembly surface 102 and assembly end 104 may be integrally bent to form a shape of "⌐".

Preferably, the single-type bracket 100 may be manufactured to have a three-dimensional hanger grip shape from the horizontal assembly surface 102 at the upper portion thereof to the assembly end 104 at the lower portion thereof, forming a structure that can maintain stiffness in all directions of X, Y, and Z-axes.

The single-type bracket 100 may be disposed between a fender apron upper member 52 and a fender panel 10.

More specifically, the assembly end 104 of the single-type bracket 100 may be mounted on the front end portion of the fender panel between a front end module 40 and a bumper cover 30 by means of bolts. Also, the horizontal assembly surface 102 of the single-type bracket 100 may be fixed to the lower end of the fender apron upper member 52 of a body frame by welding.

For reference, the fender apron upper member 52 may be disposed just over a side member 50 of the body frame, and may refer to one of frame components that are attached with a fender apron panel serving as a partition between a wheel and an engine room.

First, in order to control the assembly location of the fender panel 10 in back-and-forth and right-and-left horizontal directions, the assembly end 104 of the single-type bracket 100 may be integrally mounted on the front end portion of the fender panel 10 that is located between the front end module 40 and the bumper cover 30 by means of bolts.

Next, in order to accurately adjust parting lines with the edge of the fender panel 10 and a head lamp 25 and the bumper cover 30 adjacent thereto, the fender panel 10 may be adjusted little by little in back-and-forth or right-and-left horizontal direction. In this case, the location of a welding point of the horizontal assembly surface 102 of the single-type bracket 100 on the fender apron upper member 52 may be together controlled.

In order words, when the parting line of the fender panel 10 is adjusted, the assembly end 104 of the single-type bracket 100 may already be in integral connection with the fender panel 10, and the horizontal assembly surface 102 of the single-type bracket 100 may be in surface contact with the lower end portion of the fender apron upper member 52. Accordingly, when the fender panel 10 is adjusted little by little in back-and-forth or right-and-left horizontal direction, the location of the welding point of the horizontal assembly surface 102 of the single-type bracket 100 on the fender apron upper member 52 may be together controlled.

Accordingly, the assembly of the fender panel 10 by the single-type bracket 100 may be completed by accurately adjusting the parting lines with the edge of the fender panel 10 and the head lamp 25 and the bumper cover 30 adjacent thereto and then welding the horizontal assembly surface 102 of the single-type bracket 100 on the fender apron upper member 52.

A plurality of stiffness enhancing grooves 108 crossing each other in the longitudinal direction thereof may be formed at a section extending from the horizontal assembly surface 102 to the assembly end 104 of the single-type bracket 100 to prevent flexure or breakage of the single-type bracket 100 below the critical strength.

Figure 8:
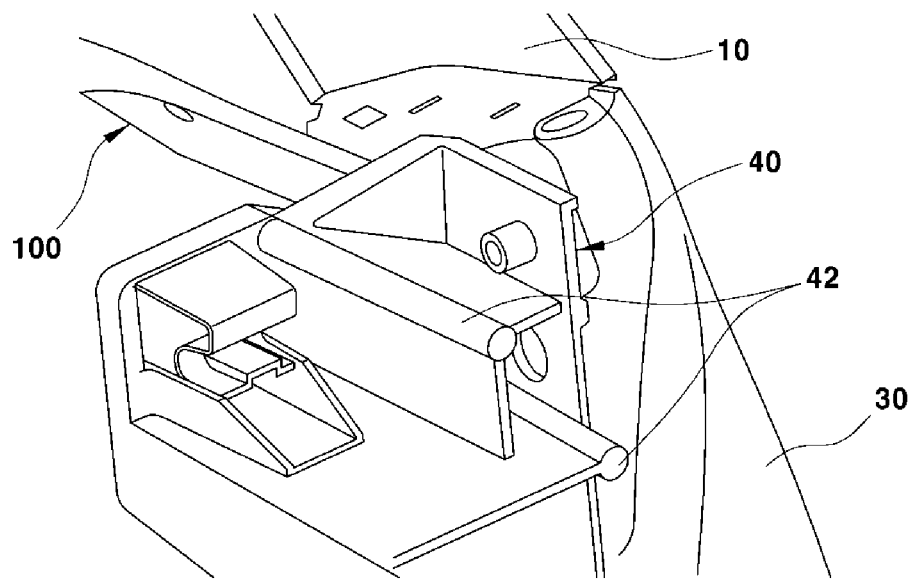
FIG. 8 is a schematic view a fender panel assembly structure according to an exemplary embodiment of the present invention, which illustrates a assembly relation between a single-type bracket and a front end module.
Figure 9:
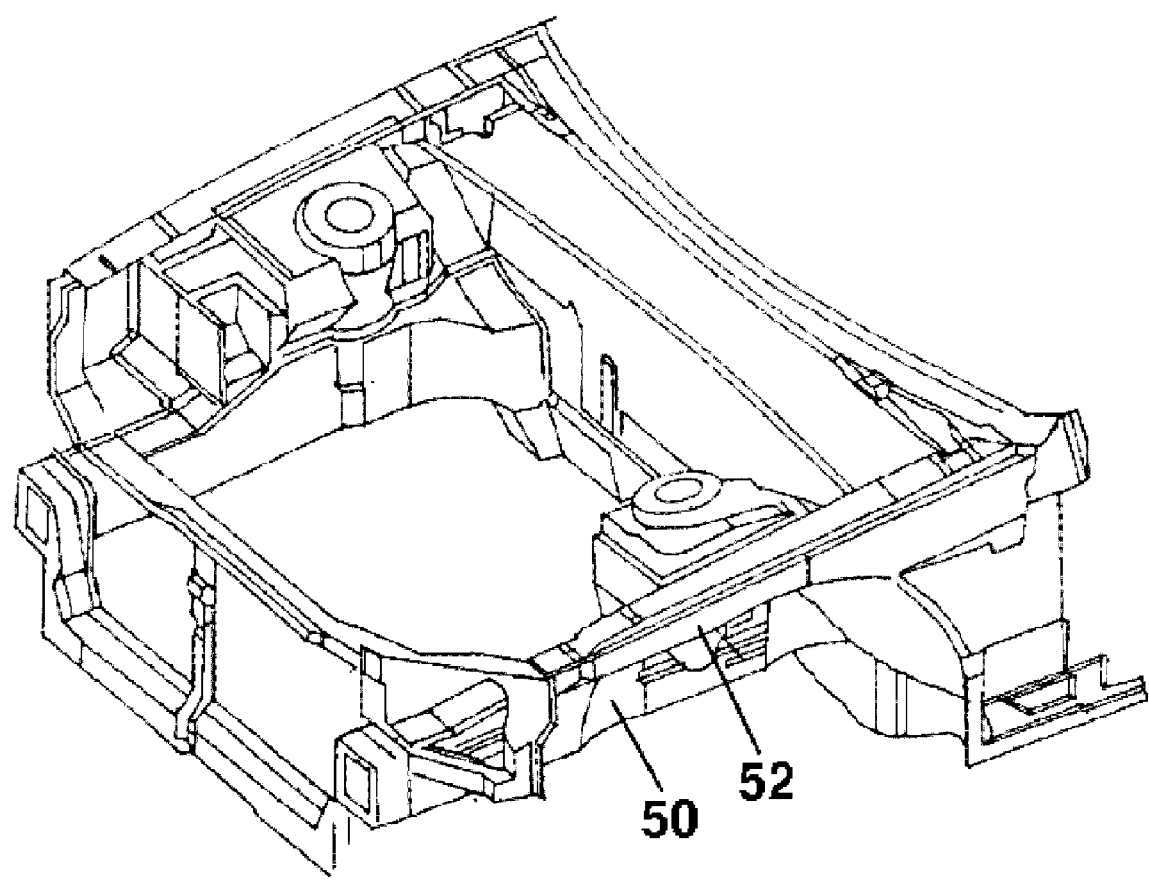
FIG. 9 is a schematic view illustrating a fender apron member of a body frame mounted with a single-type bracket.

Also, as shown in FIG. 8, the fender panel 10, the bumper cover 30, and the front end module 40 may be integrally connected to each other via a bumper bracket. The assembly end 104 of the single-type bracket 100 may extend between the front end module 40 and the bumper cover 30, and may be mounted to the front end portion of the fender panel 10 via a bolt. Accordingly, a stiffness supporting structure (stiffness supporting structure for supporting a force applied from the outside) on the front end portion of the fender panel 10 may not be provided.

For this, stiffness enhancing ends 42 may be integrally formed at the upper portion and the middle portion of the front end module 40 adjacent to the assembly end 104 of the single-type bracket 100. The stiffness enhancing ends 42 may have a circular section and extending in the longitudinal direction thereof.

Accordingly, a second bracket of two brackets becomes a stiffness supporting structure for the front end portion of the fender panel 10 in a related art, whereas the stiffness enhancing end 42 of the front end module 40 may serve to support the front end portion of the fender panel 10 using the single-type bracket 100 in the present exemplary embodiment of the present invention.

Thus, since the fender panel 10 can be more simply assembled compared to a typical one while controlling the assembly location of the fender panel 10 in back-and-forth and right-and-left horizontal directions using the single-type bracket 100, the vehicle weight and the manufacturing cost can be reduced, and also the assembly workability can be improved while reducing the assembly working time.

The present invention provides the following effects.

An apparatus for assembling a fender panel of a vehicle according to an exemplary embodiment of the present invention can reduce the weight of the vehicle body, the manufacturing cost, and the assembly working time by tightly assembling a fender panel while controlling the assembly location of the fender panel in back-and-forth and right-and-left directions using a single-type bracket.

Also, as a stiffness enhancing structure for supporting the front end portion of the fender panel is formed in a front end module, the front end portion of the fender panel that may lack of the support stiffness due to the use of a single-type bracket can be easily reinforced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for assembling a fender panel of a vehicle, comprising a single-type bracket including:
   a horizontal assembly surface at an upper end portion thereof; and
   an assembly end having a fender panel assembly aperture at a lower end portion thereof extending from the horizontal assembly surface toward a front side of the vehicle,
   wherein the assembly end of the single-type bracket is mounted on a front end portion of a fender panel located between a front end module and a bumper cover, and
   wherein the horizontal assembly surface is fixed to a lower end portion of a fender apron upper member.

2. The apparatus of claim 1, wherein the horizontal assembly surface of the single-type bracket is fixed to the lower end portion of the fender apron upper member by welding while controlling an assembly location of the fender panel in back-and-forth and right-and-left horizontal directions.

3. The apparatus of claim 1, wherein the front end module adjacent to the assembly end of the single-type bracket includes stiffness enhancing ends protruding and extending in a longitudinal direction at upper and middle portions of the front end module.

4. The apparatus of claim 1, wherein the single-type bracket has a plurality of stiffness enhancing grooves that cross each other in a longitudinal direction thereof between the horizontal assembly surface and the assembly end.

5. The apparatus of claim 1, wherein the single-type bracket has a three-dimensional hanger grip shape that extends from the horizontal assembly surface at the upper portion thereof to the assembly end at the lower portion thereof.

6. The apparatus of claim 1, wherein the horizontal assembly surface and assembly end are integrally bent to form a shape of "¬".

* * * * *